Nov. 21, 1967 E. P. WHITLOW 3,353,369
ABSORPTION REFRIGERATION SYSTEM
Filed Oct. 20, 1965 3 Sheets-Sheet 1
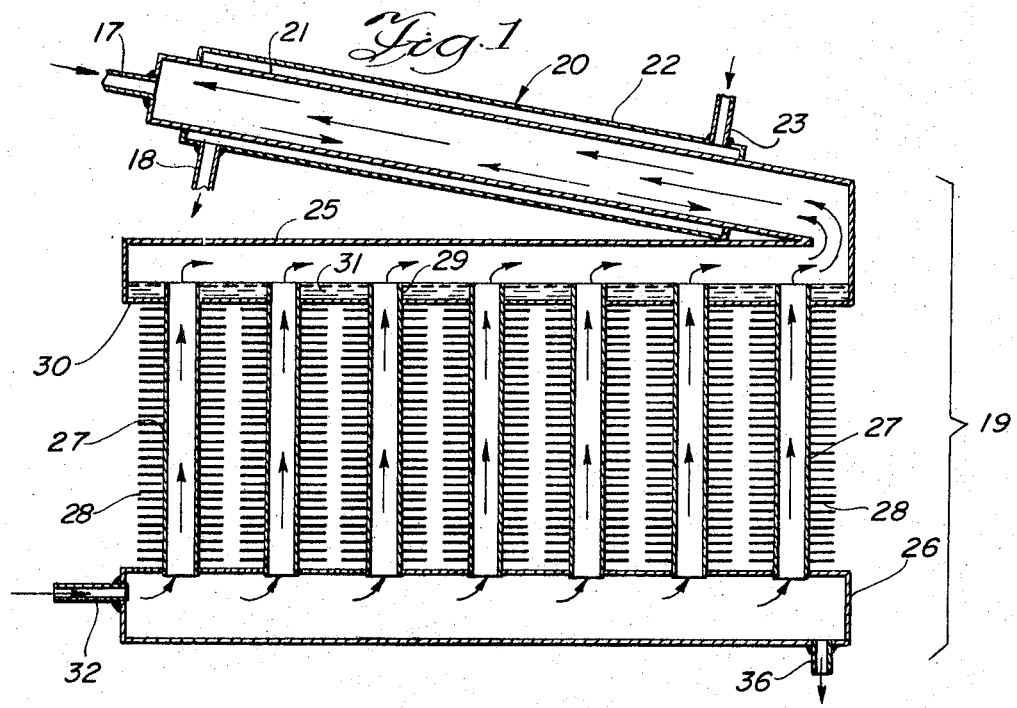
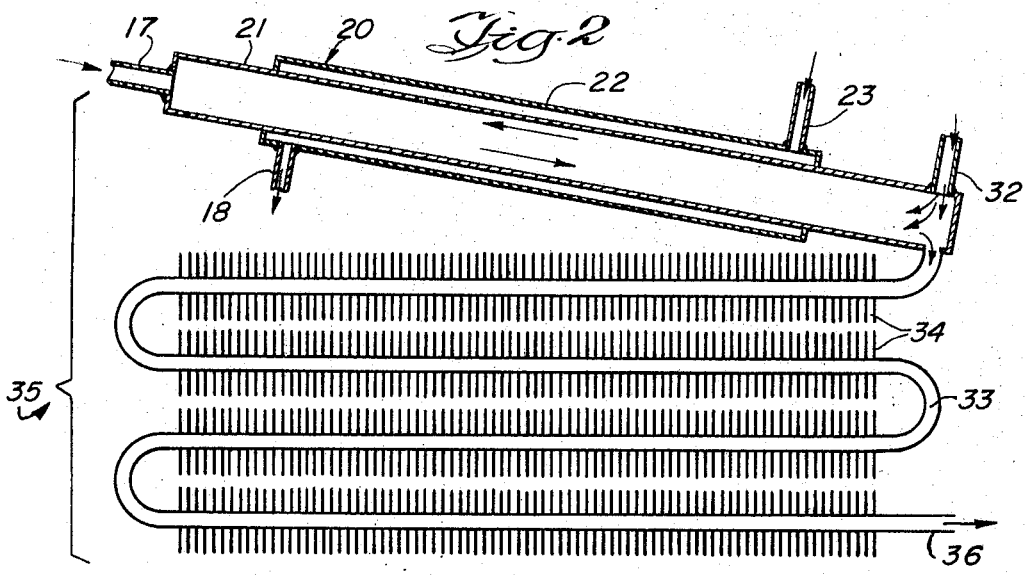
Inventor
Eugene P. Whitlow
By Hofgren, Wegner, Allen, Stellman & McCord
attorneys

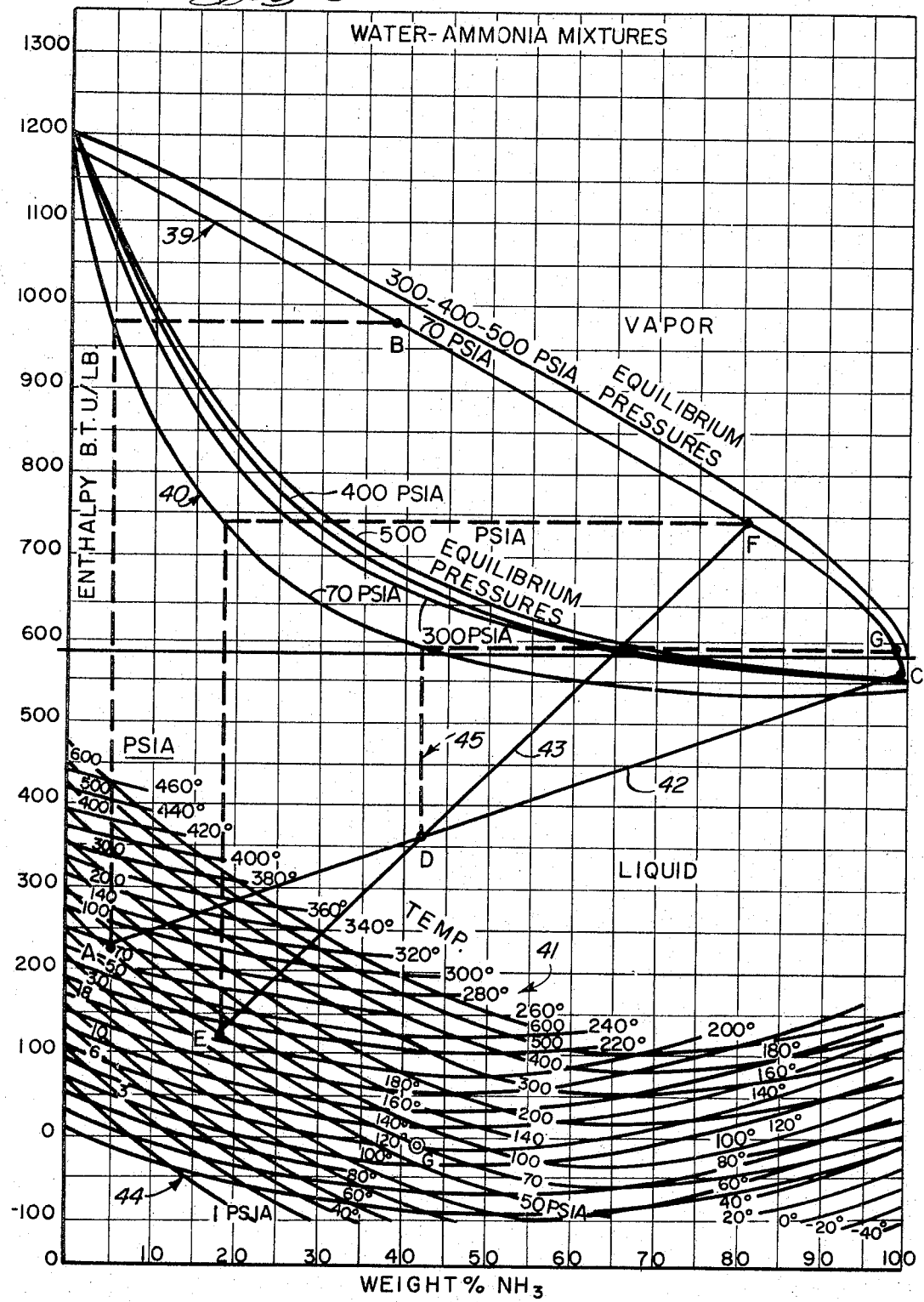

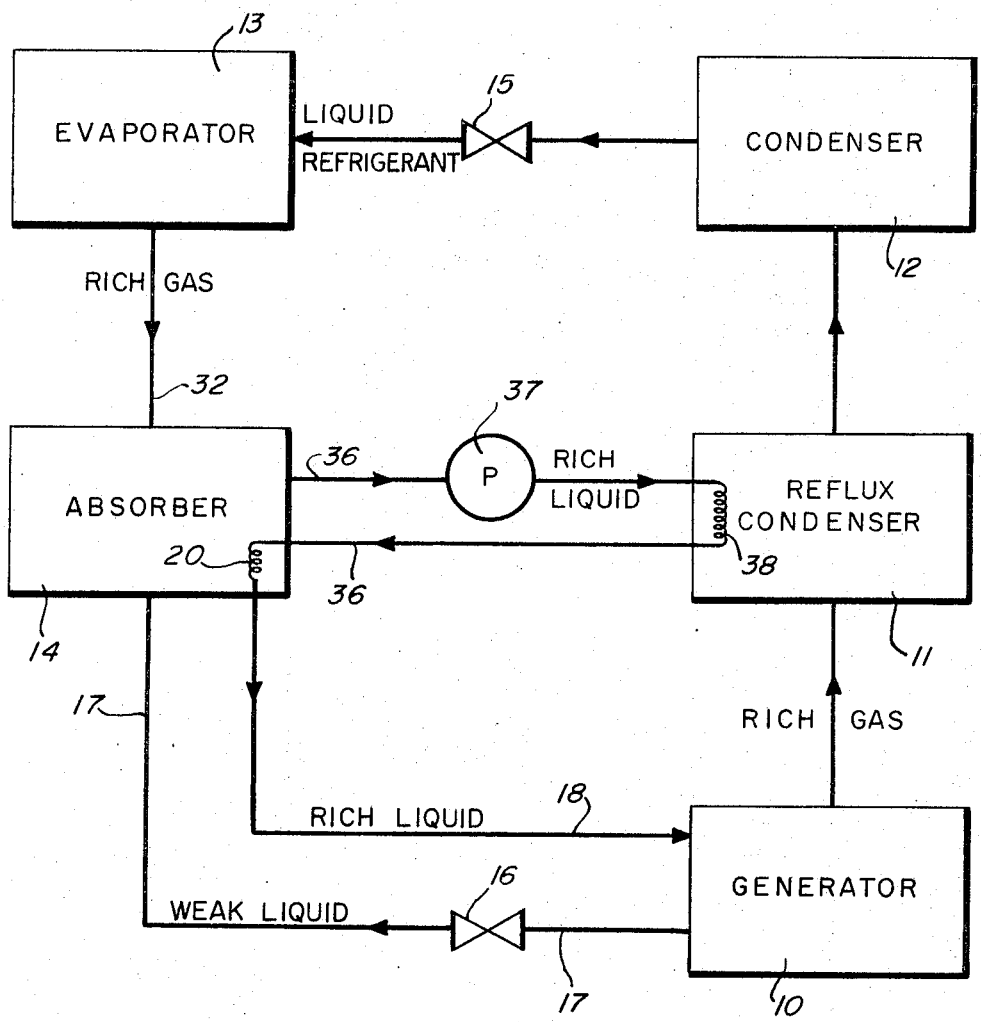

United States Patent Office 3,353,369
Patented Nov. 21, 1967

3,353,369
ABSORPTION REFRIGERATION SYSTEM
Eugene P. Whitlow, St. Joseph, Mich., assignor to Whirlpool Corporation, a corporation of Delaware
Filed Oct. 20, 1965, Ser. No. 498,236
10 Claims. (Cl. 62—494)

This invention relates to an absorption refrigeration system.

In the customary absorption refrigeration system the system is charged with refrigerant and absorption liquid with a typical refrigerant being ammonia and the absorption liquid being water. In such a system a heated boiler and rectifier, collectively referred to herein as a "generator," is used to drive gaseous refrigerant from a solution of the refrigerant in the absorption liquid. The solution that is directed to the generator is rich in dissolved refrigerant and is known as a rich liquid. In the generator the driving off of the gaseous refrigerant reduces the rich liquid to a weak liquid.

The refrigerant gas thusly produced in the generator is then conveyed to a condenser in order to condense the refrigerant gas or vapor to a liquid and this is then conveyed from the condenser to an evaporator in which evaporation of the liquid refrigerant takes place to produce the cooling effect. The resulting refrigerant vapor is then conveyed to an absorber where it is absorbed by the weak liquid from the generator to produce a rich liquid containing the dissolved refrigerant with the production of considerable amounts of heat in the absorber. The resulting rich liquid from the absorber is then conveyed to the generator where the cycle is repeated.

In a two pressure system the generator and condenser are on the high pressure side while the evaporator and absorber are on the low pressure side. Customary flow restrictors such as capillaries are provided between the generator and the absorber and the condenser and evaporator to maintain these pressure differentials.

One of the features of this invention is to provide an improved absorption refrigeration system having an absorber in which the liquid and vapor phases are in near equilibrium throughout the absorbing portion of the absorber.

Another feature of the invention is to provide such a system in which the heat of absorption is released at higher temperatures than in prior systems and in which this heat is efficiently utilized to supply a portion of the heat to the generator, with the result that the refrigeration cycle operates more efficiently with a coefficient of performance (COP) considerably greater than that customarily achieved.

A further feature of the invention is to provide such an absorption refrigeration system in which heat is also extracted from the reflux condenser which is customarily located between the generator and the condenser proper in the flow path and also convey this heat to the generator.

A further and more specific feature of the invention is to provide such systems with rich liquid from the absorber utilized as the heat exchange fluid before the rich liquid is directed into the generator.

The reclaiming of some of the absorber heat and conveying it to the generator in the manner indicated by the above features permits a lower external heat requirement in the generator and a smaller generator may be used to achieve any given refrigeration capacity. Thus, where the generator is heated by a fuel burner as is customarily the case the burner requires less fuel and a smaller burner may be used. Furthermore, because a large proportion of the heat generated in the absorber is retained within the system and conveyed to the generator the resulting heat to be rejected from the absorber is therefore smaller. This means that a smaller quantity of cooling fluid such as air is required to cool the absorber, and where the cooling fluid is air a smaller fan or other cooling fluid flow means will be required.

Other features and advantages of the invention will be apparent and will be pointed out in the following description of the invention taken in conjunction with the accompanying drawings. Of the drawings:

FIGURE 1 is a semi-diagrammatic view of one embodiment of an absorber including a heat exchanger and embodying the invention.

FIGURE 2 is a view similar to FIGURE 1 but illustrating a second embodiment.

FIGURE 3 is an enthalpy-composition chart for a water-ammonia system.

FIGURE 4 is a simplified flow diagram showing the relationship only of the parts of the absorption refrigeration system.

As shown in FIGURE 4 the general arrangement of a typical two pressure absorption refrigeration system includes a generator 10, a reflux condenser 11 and a condenser 12 on the high pressure side of the system and an evaporator 13 and an absorber 14 on the low pressure side of the system. A typical high pressure is 300 p.s.i.a. and a typical low pressure is 70 p.s.i.a. As is shown by the flow lines, the fluids flow in the following series—generator, reflux condenser, condenser, evaporator, absorber and back to the generator. In the liquid refrigerant line between the condenser and evaporator is a flow restrictor means 15 which may be the customary capillary. A similar flow restrictor 16 is located in the weak liquid line 17 between the absorber 14 and the generator 10 in the weak liquid line 17 from the generator to the absorber. There is also a rich liquid line 18 from the absorber to the generator.

An embodiment 19 of an absorber 14 is illustrated diagrammatically in FIGURE 1. This absorber includes a heat exchanger 20 at the weak liquid entrance to the absorber with the heat exchanger illustrated including a downwardly sloped fluid conduit 21 provided with heat exchange means 22 shown as an enclosing jacket having an entrance 23 for rich liquid at its lower end and the exit for rich liquid line 18 at its upper end. The fluid conduit itself is connected at its upper end to the weak liquid line 17 from the generator 10.

The fluid conduit 21 communicates at its lower end with a generally horizontal header 25. Located below this upper header 25 is a bottom header 26. Extending between the headers 25 and 26 are a plurality of vertical tubes 27 arranged generally parallel and provided with air cooling fins 28. The upper end 29 of each tube 27 extends above the bottom 30 of the upper header 25 so that during normal operation of the absorber a pool 31 of liquid is maintained on the bottom of the header 25.

The bottom header 26 is provided at one end with a line 32 for supplying substantially pure ammonia vapor (refrigerant vapor) to the absorber from the evaporator 13. On the opposite side of the bottom header 26 there is provided a rich liquid line 36 for conveying rich liquid formed in the absorber 14 from the absorber to the jacket 22 of the heat exchanger 20 by way of the inlet line 23.

In the embodiment of FIGURE 2 the absorber 35 comprises the upper heat exchanger 20, as described above in connection with the embodiment of FIGURE 1 including the same fluid conduit 21, heat exchange means 22 in the form of the surrounding jacket having the entrance 23 for the rich liquid and exit for rich liquid line 18 and the weak liquid line 17 communicating with the upper end of the sloped fluid conduit 21, and an air cooled heat exchanger 33 connecting to the lower end of conduit 21. The FIGURE 2 embodiment is a compromise; it accomplishes part of what is possible in the embodiment of FIGURE 1. The embodiment of FIGURE 2 may be employed instead of that of FIGURE 1 for practical reasons to facilitate construction. The larger tubes of FIGURE 1 hold the vapor velocity low so that it can travel countercurrent to the liquid. FIGURE 2 uses smaller tubes which can be bent on short radii, but the vapor velocities are necessarily relatively high. These higher velocities do not permit the vapor to flow countercurrent to the liquid in heat exchanger 33 as is possible in the vertical tubes 27 in the embodiment of FIGURE 1. However, the vapor does flow countercurrent to the liquid in conduit 21 so that a substantial part of the temperature gain is realized in this compromise design. In this FIGURE 2 embodiment, as contrasted to the embodiment of FIGURE 1, the rich refrigerant gas conduit 32 from the evaporator 13 communicates with the fluid conduit 21 at the bottom thereof. The bottom end of the sloped fluid conduit 21 leads to the serpentine air cooled pipe heat exchanger 33 provided on the exterior with heat transfer fins 34. The remote end of this air cooled heat exchanger 33 communicates with the rich liquid line 36 leading to the cooling jacket 22 of the heat exchanger 20 of FIGURE 2.

With the above described arrangement a substantial amount of the heat generated in the absorber 19 of the first embodiment of FIGURE 1 and the absorber 35 of the second embodiment of FIGURE 2 is utilized by transferring it to the generator. Because the heat generated in the absorber has its maximum temperature adjacent the entrance end, which is where the weak liquid from the conduit 17 first contacts the ammonia vapor, the heat exchanger 20 encompasses this weak liquid entrance to the absorber to preheat rich liquid flowing through the conduit 21 of the heat exchanger 20. The exit 50 of the rich liquid conduit 21 is located adjacent the entrance end of the absorber so that the rich liquid can leave heat exchanger 20 at substantially its highest temperature.

Although any coolant may be used in this heat exchanger means to transfer heat from the hottest part of the absorber to the generator, the preferred coolant for obvious reasons is the rich liquid itself which is formed in the absorber. Thus, the rich liquid from the absorber 14 as shown in FIGURE 4 is first passed through the reflux condenser and then through the absorber in heat exchange relationship therewith as indicated by the heat exchanger 20 in FIGURE 4. In the specific embodiment of FIGURE 4 the rich liquid in line 36 from the absorber is forced by means of a pump 37 through a heat exchanger 38 in heat exchange relationship with the reflux condenser 11 to pick up heat at the reflux condenser before being forced through the heat exchanger 20 that is in heat exchange relationship with the absorber 14 in the manner described above in conjunction with the embodiments of FIGURES 1 and 2. As indicated, from the heat exchanger 20 the rich liquid flows by way of the line 18 into the generator.

In order to provide more efficient heat transfer at the hottest end of the absorber where the heat exchanger 20 is located, the liquid coolant, here specifically rich liquid, in the heat exchanger 20 is directed countercurrent to liquid flow in the conduit 21 and concurrent with vapor flow therein. Thus, in the embodiment of FIGURE 1 weak liquid flows into the heat exchanger 20 by way of the line 17. It then flows down the inclined conduit 21 into the upper header 25 and then down through the vertical tubes 27 into the lower header 26. Ammonia vapor flows countercurrently thereto by entering the bottom header 26 through the rich gas line 32, then up through the tubes 27 into the upper header 25 and then up into the conduit 21. As is customary, absorption of refrigerant vapor in the absorption liquid takes place throughout the system.

In the embodiment of FIGURE 2 the rich gas is directed by way of the line 32 into the bottom end of the inclined conduit 21. Also from this bottom end of the conduit 21 the air cooled pipe 33 conveys the fluids to the rich liquid line 36.

In the enthalpy-composition chart of FIGURE 3 the weight percentage of ammonia in the fluid is the abscissa and the enthalpy in B.t.u. per pound is the ordinate. The upper set of lines 39 refers to the vapor conditions and are equilibrium pressure lines where the pressure is constant and records the percentage of ammonia at different enthalpy. The lower set of lines 40 are similar but relate to the equilibrium pressure-composition conditions in the liquid. The chart of course is for mixtures of water as the absorbent liquid and ammonia as the refrigerant.

In one embodiment of the invention the evaporator temperature was 40° F., the absorber pressure was 70 p.s.i.a., the rich gas entering the absorber from the evaporator was 99.9% ammonia and the relative circulation was 1.6 pounds of weak liquid per pound of refrigerant. In this embodiment the absorption refrigeration system of FIGURE 4 was used for air conditioning and therefore the evaporator temperature was relatively high at 40° F. Under these operating conditions the hottest part of the absorber which is in the fluid conduit 21 adjacent the weak liquid inlet 17 was at a higher temperature than a part of the generator. Thus with the weak solution containing 5% ammonia and the rich solution 42% ammonia, the temperature at the top of the absorber in the conduit 21 was theoretically 273° F. while boiling in the generator begins at 230° F.

These operating conditions are based on the assumption that the vapor and the liquid in the absorber are in equilibrium, even at the liquid inlet or high temperature end of the absorber. If this were true, point A on the chart of FIGURE 3 would define the conditions of the liquid in the absorber with a weak solution of 5% ammonia and 95% water at the equilibrium pressure of 70 p.s.i.a., and point B the ammonia content (39%) of the vapor. The equilibrium temperature under these conditions would then be 273° F. as shown by temperature curves 41.

In the customary concurrent absorber the relatively pure ammonia vapor from the evaporator is introduced to the absorber at the point where the weak liquid is introduced; these two fluids are not in equilibrium. When the 5% weak solution from the generator and the essentially pure ammonia vapor from the evaporator are brought in contact in the concurrent flow absorber the system will attempt to establish equilibrium by adjusting both vapor and liquid phase compositions to a set of compositions which are in equilibrium. This readjustment will take place adiabatically. To determine these equilibrium conditions point C on the vapor curve 39 for 70 p.s.i.a. represents the composition of the entering vapor which as noted is about 99.9% ammonia. When the liquid A and the vapor C are brought together adiabatically in concurrent flow the resulting mixture will have an over-all composition enthalpy indicated by some point along the straight line 42 connecting weak liquid point A and rich vapor point C. When the liquid A and the vapor C are thus brought together under adiabatic conditions, the compositions of both phases attempt to change because liquid A and vapor C are not equilibrium compositions but are in constant change, with some of the ammonia vapor being absorbed in the absorption liquid and some of the water evaporating out of the liquid phase and entering the vapor phase.

With the ratio of weak liquid to ammonia being 1.6 pounds of the 5% liquid per pound of ammonia vapor the over-all composition thus contained approximately 42% ammonia. This concentration determines the point D along the A–C line. The composition of the vapor phase and the liquid phase in equilibrium would then be determined by a tie line 43 passing through point D.

In attempting to establish the equilibrium conditions the composition of the weak liquid will become richer and the composition of the rich gas will become weaker. Thus, the composition of the liquid will approach point E along the 70 p.s.i.a. line of the set of lines 44 and because tie line 43 is a straight line it is clearly indicated that the composition of vapor along the 70 p.s.i.a. line of the set of lines 39 will approach point F. Under these conditions, for concurrent flow, the resulting highest temperature in the absorber is not the theoretically supposed 273° F., if equilibrium conditions had been achieved at the very beginning, but is actually 210° F. as shown by the temperature lines 41.

In the absorber of this invention conditions very close to theoretical prevail and the coefficient of performance is greatly increased over that achieved where weak liquid and rich gas flows are concurrent in the absorber. This is accomplished in the present invention by introducing the weak liquid into that portion of the absorber where it initially contacts the vapor in its weakest condition. Thus, as illustrated in FIGURES 1 and 2, the weak liquid such as the above-mentioned 5% ammonia solution enters the absorber at 17. The rich gas such as 99.9% ammonia vapor from the evaporator, on the other hand, enters at 32 or the opposite end of the absorber. The liquid and vapor then flow concurrently to each other. As a result, the vapor by the time it reaches the upper end of the absorber portion 21 is at its weakest when it initially contacts the weak liquid. Similarly, the liquid is at its richest in the bottom portion of the absorber where it first contacts the rich gas. As a result, the vapor and liquid phases at any point in the absorbing portion of the absorber are very near equilibrium. Under these conditions absorption will take place with the highest temperature approaching the 273° F. of the equilibrium conditions of point A on the chart of FIGURE 3. Because this maximum temperature is achieved at the hot end of the absorber the heat exchanger 20 is located here so that a large portion of this heat can be transferred by the heat exchange fluid, which is the rich liquid in the embodiments of FIGURES 1 and 2, to the generator 10 with the previously discussed advantages. The major advantage achieved in passing the refrigerant vapor through the absorber in countercurrent flow to the absorption liquid is that the temperature at the high or weak end of the absorber will be considerably higher than if the vapor and liquid were flowing concurrently through the absorber. This counterflow therefore permits more of the absorber heat to be salvaged and put back into the generator than was heretofore possible with the customary absorber.

Having described my invention as related to the embodiments shown in the accompanying drawings, it is my intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. In an absorption refrigeration system charged with refrigerant and absorption liquid including a generator where heat is applied to drive gaseous refrigerant from rich liquid, apparatus comprising: an absorber for contacting absorption liquid with gaseous refrigerant for absorption in said liquid; means for introducing weak liquid into said absorber including a fluid conduit at the weak liquid entrance to said absorber in which the initially introduced weak liquid first contacts gaseous refrigerant with the resultant generation of heat; and heat transfer means for transferring said heat from said fluid conduit to said generator comprising means for passing refrigerant rich liquid from said absorber in heat transfer relationship with said fluid conduit prior to the introduction of said rich liquid in said generator, said heat transfer means comprising a heat exchanger in heat exchange relationship with said fluid conduit for carrying refrigerant rich liquid from said fluid conduit to said generator to transfer the heat of absorption to said generator in the refrigerant rich liquid carried by said heat exchanger, said heat exchanger having an exit line connecting directly to said generator for maximum transfer of the heat of absorption to said generator.

2. In an absorption refrigeration system charged with refrigerant and absorption liquid including a generator where heat is applied to drive gaseous refrigerant from rich liquid, a condenser and a reflux condenser between the generator and the condenser for condensing moisture and returning it to the generator, apparatus comprising: an absorber for contacting absorption liquid with gaseous refrigerant for absorption in said liquid to convert said liquid to rich liquid; means for introducing weak liquid into said absorber including a fluid conduit at the weak liquid entrance to said absorber in which the initially introduced weak liquid first contacts gaseous refrigerant with the resultant generation of heat; and means for passing said rich liquid from said absorber in heat absorbing relationship with said reflux condenser and said conduit, and then to said generator to transfer the absorbed heat thereto.

3. In an absorption refrigeration system charged with refrigerant and absorption liquid including a generator where heat is applied to drive gaseous refrigerant from rich liquid, a condenser and a reflux condenser between the generator and the condenser for condensing moisture and returning it to the generator, apparatus comprising: an absorber for contacting absorption liquid with gaseous refrigerant for absorption in said liquid to convert said liquid to rich liquid; means for introducing weak liquid into said absorber including a fluid conduit at the weak liquid entrance to said absorber in which the initially introduced weak liquid first contacts gaseous refrigerant with the resultant generation of heat; and heat exchange means for passing said rich liquid from said absorber in heat transfer relationship with said reflux condenser to receive heat therefrom, then in heat transfer relationship with said conduit to receive heat therefrom and then in heat transfer relationship with said generator to impart heat thereto.

4. In an absorption refrigeration system charged with refrigerant and absorption liquid including a generator where heat is applied to drive gaseous refrigerant from rich liquid, a condenser and a reflux condenser between the generator and the condenser for condensing moisture and returning it to the generator, apparatus comprising: an absorber for contacting absorption liquid with gaseous refrigerant for absorption in said liquid to convert said liquid to rich liquid; means for introducing weak liquid into said absorber including a fluid conduit at the weak liquid entrance to said absorber in which the initially introduced weak liquid first contacts gaseous refrigerant with the resultant generation of heat; and heat exchange means for passing said rich liquid from said absorber in heat transfer relationship with said reflux condenser to receive heat therefrom, then in heat transfer relationship with said conduit and countercurrently to the liquid flow therein to receive heat therefrom and then in heat transfer relationship with said generator to impart heat thereto.

5. The apparatus of claim 4 wherein said conduit has an entrance for weak liquid, and said heat exchange means at said conduit has an exit for rich liquid adjacent said entrance.

6. In an absorption refrigeration system charged with refrigerant and absorption liquid including a generator where heat is applied to drive gaseous refrigerant from rich liquid, apparatus comprising: an absorber for contacting absorption liquid with gaseous refrigerant for absorption in said liquid to convert said liquid to rich liquid; means for introducing weak liquid into said absorber including a fluid conduit at the weak liquid entrance to said absorber in which the initially introduced weak liquid first contacts gaseous refrigerant with the resultant generation of heat; means for introducing rich gas into said absorber at the rich liquid exit from said absorber, the liquid and gas within the absorber thereby flowing countercurrently; and means for passing said rich liquid from said absorber in heat transfer relationship with said conduit and then to said generator to transfer said heat to said generator, said means for passing rich liquid comprising a heat exchanger in heat exchange relationship with said fluid conduit for carrying the heat of absorption to said generator in the rich liquid carried by said heat exchanger, said heat exchanger having an exit line connecting directly to said generator for maximum transfer of the heat of absorption to said generator.

7. In an absorption refrigeration system charged with refrigerant and absorption liquid including a generator where heat is applied to drive gaseous refrigerant from rich liquid, apparatus comprising: means forming an absorber comprising a fluid conduit for contacting absorption liquid with gaseous refrigerant for absorption in said liquid; means forming a weak liquid entrance to said fluid conduit; means forming a gaseous refrigerant entrance to said fluid conduit spaced below said means forming a weak liquid entrance, so that the weak liquid tnd gaseous refrigerant within the absorber flow countercurrently during absorption with the resultant generation of heat at a relatively high temperature and the vapor and liquid phases at any point in the absorbing portion of the absorber are very near equilibrium; and heat transfer means for transferring said heat from said fluid conduit to said generator, said heat transfer means comprising a heat exchanger in heat exchange relationship with said fluid conduit for carrying a fluid from said fluid conduit to said generator in the fluid carried by said heat exchanger, said heat exchanger having an exit line connecting directly to said generator for maximum transfer of the heat of absorption to said generator.

8. The apparatus of claim 7 wherein said heat transfer means has an entrance connected to a source of rich liquid and comprises means for passing refrigerant rich liquid from said absorber in heat transfer relationship with said fluid conduit prior to the introduction of said rich liquid to said generator.

9. The apparatus of claim 8 wherein said rich liquid is passed countercurrently to liquid flowing in said conduit to obtain optimum heat transfer to said rich liquid.

10. The apparatus of claim 7 wherein there is a heat exchanger connecting to the lower end of said fluid conduit to receive liquid and vapor from said fluid conduit for concurrent flow through said heat exchanger.

References Cited

UNITED STATES PATENTS

| 1,085,624 | 2/1914 | McKee | 62—494 X |
| 2,207,260 | 7/1940 | Kuenzli | 62—494 X |
| 2,552,071 | 5/1951 | Terrill | 62—494 X |
| 3,037,361 | 6/1962 | Merrick | 62—494 X |
| 3,078,690 | 2/1963 | Phillips et al. | 62—494 X |
| 3,124,938 | 3/1964 | Leonard | 62—494 X |

LLOYD L. KING, *Primary Examiner.*